(12) United States Patent
Al Marri

(10) Patent No.: US 10,715,018 B2
(45) Date of Patent: Jul. 14, 2020

(54) ALTERNATOR DEVICE

(71) Applicants: Saqr Majed Bin Saqr Al Marri, Dubai (AE); SALEM SAQR MAJED BIN SAQR ALMARRI, Dubai (AE)

(72) Inventor: Saqr Majed Bin Saqr Al Marri, Dubai (AE)

(73) Assignees: SALEM SAQR MAJED BIN SAQR ALMARRI, Dubai (AE); Saqr Majed Bin Saqr Al Marri, Dubai (AE)

( * ) Notice: Subject to any disclaimer, the term of this patent is extended or adjusted under 35 U.S.C. 154(b) by 293 days.

(21) Appl. No.: 15/689,739

(22) Filed: Aug. 29, 2017

(65) Prior Publication Data

US 2017/0358977 A1 Dec. 14, 2017

Related U.S. Application Data

(62) Division of application No. 14/713,007, filed on May 15, 2015, now Pat. No. 10,020,718.

(51) Int. Cl.
| | |
|---|---|
| *H02K 21/44* | (2006.01) |
| *H02K 11/04* | (2016.01) |
| *H02K 1/22* | (2006.01) |
| *H02K 11/33* | (2016.01) |
| *F03D 9/25* | (2016.01) |
| *H02K 15/02* | (2006.01) |

(52) U.S. Cl.
CPC ............. *H02K 21/44* (2013.01); *F03D 9/25* (2016.05); *H02K 1/22* (2013.01); *H02K 11/046* (2013.01); *H02K 11/33* (2016.01); *H02K 15/02* (2013.01); *Y02E 10/725* (2013.01)

(58) Field of Classification Search
CPC ........ F03D 9/25; H02K 11/046; H02K 11/33; H02K 15/02; H02K 1/22; H02K 21/44; Y02E 10/725
See application file for complete search history.

(56) References Cited

U.S. PATENT DOCUMENTS

| | | | |
|---|---|---|---|
| 5,021,698 A | 6/1991 | Pullen et al. | |
| 5,982,070 A | 11/1999 | Caamano | |
| 7,315,103 B2 | 1/2008 | Qu et al. | |
| 7,382,077 B2 * | 6/2008 | Mossner | H02K 1/12 310/156.32 |
| 7,939,983 B2 | 5/2011 | Okamoto | |
| 10,020,718 B2 * | 7/2018 | Al Marri | H02K 21/44 |

(Continued)

*Primary Examiner* — Minh N Trinh
(74) *Attorney, Agent, or Firm* — Hayes Soloway PC

(57) ABSTRACT

An alternator device for converting mechanical energy into electrical energy, including first rotating disk comprising first coils ducts; second rotating disk including second coil ducts; a magnet located intermediate the first and second rotating disks to generate first magnetic field having first magnetic pole at the first coil ducts and second magnetic field having second magnetic pole opposite the first magnetic pole at the second coil ducts; and a coil base intermediate the first and second rotating disks, the coil base to receive coils aligned with the first and second coil ducts; wherein the first and second rotating disks are adapted to rotate along a rotation axis while the magnet and the coil base remain in static position, rotation of the rotating disks enabling a rotational movement of the magnetic fields through the coils for generation of electric current within the coils, and a method of manufacturing such device.

5 Claims, 6 Drawing Sheets

(56) References Cited

U.S. PATENT DOCUMENTS

| | | |
|---|---|---|
| 2004/0036374 A1 | 2/2004 | Noble et al. |
| 2007/0247017 A1 | 10/2007 | Bumby |
| 2008/0001491 A1 | 1/2008 | Qu et al. |
| 2010/0283252 A1 | 11/2010 | Fradella |
| 2016/0336820 A1 | 11/2016 | Al Marri |
| 2018/0248455 A1 | 8/2018 | Al Marri |

* cited by examiner

ALTERNATOR DEVICE

CROSS REFERENCE TO RELATED APPLICATION

This application is divisional of U.S. patent application Ser. No. 14/713,007, filed on May 15, 2015, now U.S. Pat. No. 10,020,718, the entire disclosure of which is incorporated herein by reference.

FIELD OF THE INVENTION

The present invention relates to the field of energy conversion from mechanical/motional energy into electrical energy. More particularly, the present invention provides an improved alternator device for converting mechanical/motional energy into electrical energy.

BACKGROUND OF THE INVENTION

In this technologically running world, energy is essential for each and every system or machine to work. Energy can be of any type, for example heat energy, electrical energy, mechanical energy, chemical energy, and the like.

As we all know, energy can neither be created nor be destroyed, it can be converted from one form to another form. So, the energy conversion field has always been the subject of invention. The invention in energy conversion field takes place very frequently, at the same time it has never been easy to invent any device or method for converting one form of energy to another form of energy. It is already known through the study of thermodynamics that energy can be converted from one form to another form. For example, chemical energy into heat energy, heat energy into mechanical energy, mechanical energy into electrical energy, and the like.

Energy is the main requirement for the efficient working of the present industrial world. Moreover, the electrical energy is the main source of providing power to every industrial activity. The well-known methods for generating the electrical energy require the use of hydrocarbons which are polluting our environment. Hence, there is always a need for generating electrical energy from other energy sources.

Some of the well-known methods are use of hydro energy, wind energy, atomic energy, and other renewable energy sources into electrical energy. However, such conversion is not always hundred percent efficient and there is always a loss of energy during the conversion process.

Hence, there is always a requirement of devices which can efficiently convert naturally available renewable energy into electrical energy. Moreover, there is always a requirement of devices which can covert one form of energy into another form of energy without wasting the valuable part of the energy during the conversion process.

A lot of devices and methods have been suggested in the art for conversion of energy from one form to another form. The most wanted devices and methods in the field of energy conversion is a device which can convert mechanical energy into electrical energy. We have lot of sources around us which can give input as mechanical energy. However, due to lack of efficient devices and methods such mechanical energy input cannot be converted efficiently into another useful form of energy.

This problem of efficient conversion of mechanical energy into electrical energy is solved up to some extent. There have been some solutions to this problem, for example, electrical generator, hydraulic turbine and the like. Every such device and method has their own advantages and disadvantages and thus accordingly gets implemented.

Traditional solutions do provide a way for conversion of mechanical energy into electrical energy, but still have limitations. These limitations are based on sources of mechanical energy, loss of energy during conversion, compactness, installation and the like. A disadvantage of traditional alternators is the energy loss due to the contact between the magnetized disks and/or coil ducts. Another disadvantage of traditional alternators is the loss of energy due to the dual pole magnetization (North and South) of a same magnetized disk/coil duct during operation.

Also, traditional alternators have N/S alternating members which results in magnetizing the fixed magnet, so it is difficult to turn the alternator. These traditional alternators require electromagnetic energy to enable them to rotate.

SUMMARY OF THE INVENTION

Accordingly, there is a need to develop a device adapted to convert mechanical energy into electrical energy which overcomes the abovementioned drawbacks.

A alternator device and a method for converting mechanical energy into electrical energy are disclosed by the present invention. The present alternator device works on the principle of magnetization. The present alternator device converts mechanical energy into electrical energy by mechanically rotating a plurality of rotating disks comprising coil ducts around a magnet of the alternator device. The rotating disks are not in physical contact between each other. The rotating disks comprising the coil ducts are positioned in such a manner that each rotating disk is magnetized by a single pole (North or South) of the magnet. The alternator device of this invention does not need electromagnetic energy to turn the alternator. Motion energy can be used to turn the alternator. A human being can easily rotate the alternator and generate electricity. This is of a great application to wind turbines for example.

According to an embodiment of the invention, the device is adapted to create a magnetic field with minimum amount of energy required to rotate the rotating disks without need of electromagnetic energy and operate the device for the production of electrical energy from mechanical energy. This is partially due to the absence of physical contact between the magnetized disks. According to an embodiment of the invention, the device is adapted to be a very simple alternator device without brushes and hence requires minimum maintenance. According to an embodiment of the invention, the device is adapted to produce continuous electricity from the magnetic field inside the conventional alternator device and to store the electrical energy inside an energy storage unit such as a battery and/or to operate electrical components. The device can be adapted to be connected to a wind turbine for rotating the magnetized disks and operating the device. According to an embodiment of the invention, the device is adapted to produce negligible noise during operation due to the non-contact of the magnetic disks between them during operation.

Accordingly, as a first aspect of the invention there is provided a alternator device for converting mechanical energy into electrical energy, the device comprising:
 a first rotating disk comprising first coils ducts;
 a second rotating disk comprising second coil ducts;
 a magnet adapted to be located intermediate the first and second rotating disks and to generate a first magnetic field having a first magnetic pole at the first coil ducts and a second magnetic field having a second magnetic pole opposite the first magnetic pole at the second coil ducts; and a coil base adapted to be located intermediate the first and second rotating disks, the coil base being adapted to receive coils in a position alignment with the first and second coil ducts; and wherein the first and second rotating disks are adapted to rotate along a rotation axis while the magnet and the coil base remain in a static position, the rotation of the rotating disks enabling a rotational movement of the magnetic fields through the coils for the generation of electric current within the coils.

Preferably, the rotating shaft has a longitudinal axis and the rolling member is adapted to be coupled to the rotating shaft and to rotate while the rotating shaft is in rotation. Preferably, the first and second rotating disks have respectively a first central opening and a second central opening adapted to receive the rolling member for enabling the first and second rotating disks to rotate while the rotating shaft is in rotation, the rotation axis of the first and second rotating disks being the longitudinal axis of the rotating shaft.

Preferably, the first rotating disk has a first disk perimeter and comprises first extension members at first spaced-apart intervals, the first extension members extending radially outwardly from the first disk perimeter for forming the first coil ducts defined between the first spaced-apart intervals; and the second rotating disk has a second disk perimeter and comprises second extension members at second spaced-apart intervals, the second extension members extending radially outwardly from the second disk perimeter for forming the second coil ducts defined between the second spaced-apart intervals.

Preferably, the magnet comprises a magnet periphery and a magnet central opening adapted to receive the rotating shaft for centering the magnet about the longitudinal axis of the rotating shaft; and the coil base is adapted to be coupled to the magnet and to extend radially outwardly from the magnet periphery in a direction opposite to the magnet opening in a same planar plan.

Preferably, the magnet comprises a north pole magnet surface and a south pole magnet surface, the north pole magnet surface being adapted to project towards the first rotating disk and the south pole magnet surface being adapted to project towards the second rotating disk when the magnet is mounted along the rotating shaft; and the first and second rotating disks are adapted to be mounted along the longitudinal axis of the rotating shaft parallel to each other in such a manner that magnet is located intermediate the first and second rotating disks.

Preferably, the first and second rotating disks are made of a magnetic material; and the rotating shaft, the rolling member and the coil base are made of a non-magnetic material.

Preferably, the first and second rotating disks are made of iron; and the rotating shaft is made of stainless steel, the rolling member is made of reinforced plastic and the coil base is made of wood.

Preferably, the coil base has a circular periphery and comprises coil openings adapted to receive the coils at third spaced-apart intervals along the coil base periphery, the third spaced-apart intervals are substantially equivalent to the first and second spaced-apart intervals.

Preferably, the magnet is physically distant from the first and second rotating disks such that there is no physical contact therebetween.

Preferably, the coils comprise first coils generating a positive electrical field and second coils generating a negative electrical field, the first and second coils alternating in position with respect to each other.

Preferably, the device further comprises a first electrical circuit comprising first electrical wires connected to the first coils; and a second electrical circuit comprising second electrical wires connected to the second coils.

Preferably, the second electrical circuit further comprises a power inverter for inverting the negative electrical field into a positive electrical field.

Preferably, the first electric circuit further comprises a first electric rectifier; and the second electric circuit further comprises a second electric rectifier.

Preferably, the rotating shaft is adapted to be connected to a mechanical energy generation device for providing the mechanical energy for conversion into the electrical energy.

Preferably, the device does not require electromagnetic energy to run the device and wherein the mechanical energy generation device is a wind turbine.

As another aspect of the invention, there is provided a method of manufacturing a alternator device for converting mechanical energy into electrical energy, the method comprising:

providing a magnet having a north pole magnet surface and a south pole magnet surface;

providing a first and second rotating disks;

providing a coil base comprising coils;

providing a rotating shaft;

providing mounting members; and mounting the magnet and the rotating disks on the rotating shaft using the mounting members such that the magnet is located intermediate the first and second rotating disks without a physical contact therebetween, where the north pole magnet surface projects towards the first rotating disk and the south pole magnet surface projects towards the second rotating disk, and such that when the rotating shaft is in rotation, the rotating disks rotate while the magnet and the coil base remain in a static position.

Preferably, the rotating disks are made of a magnetic material; and the coil base, the rotating shaft and the mounting members are made of a non-magnetic material.

Preferably, the rotating disks are made of iron; and the coil base is made of wood, the rotating shaft is made of stainless steel and the mounting members are made of reinforced plastic or stainless steel.

Preferably, the method further comprises adapting the rotating shaft to be connected to a mechanical energy generation device for enabling the rotation of the rotating shaft.

Preferably, the mechanical energy generation device is a wind turbine.

These aspects of the present invention, along with the various features of novelty that characterize the present invention, are pointed out in the below mentioned description. For a better understanding of the present invention, its operating advantages, and the specific objects attained by its uses, reference should be made to the accompanying drawing and descriptive matter in which there is illustrated an exemplary embodiment of the present invention.

BRIEF DESCRIPTION OF THE DRAWINGS

The advantages and features of the present invention will become better understood with reference to the following detailed description taken in conjunction with the accompanying drawings, in which.

Like reference numerals refer to like parts throughout the description of several views of the drawing.

DESCRIPTION OF THE INVENTION

Figure 1:
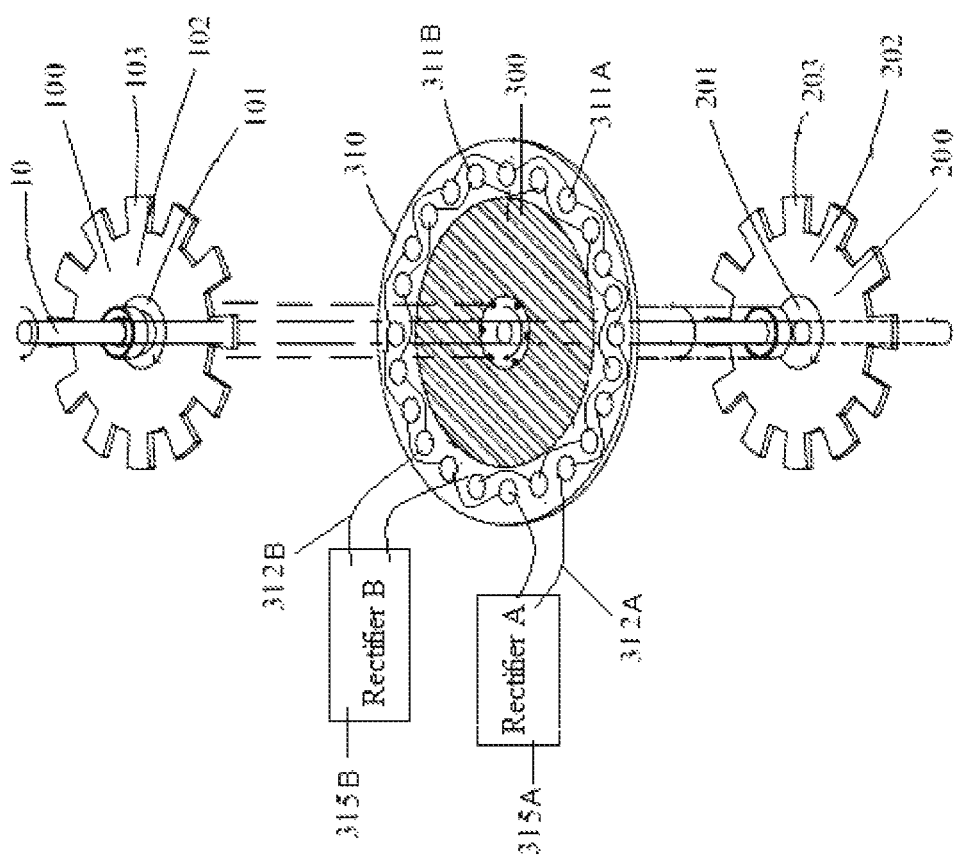
FIG. 1 is a diagram illustrating an arrangement of the components of the alternator device along the rotating shaft with respect to each other, according to an embodiment of the present invention.
Figure 2:
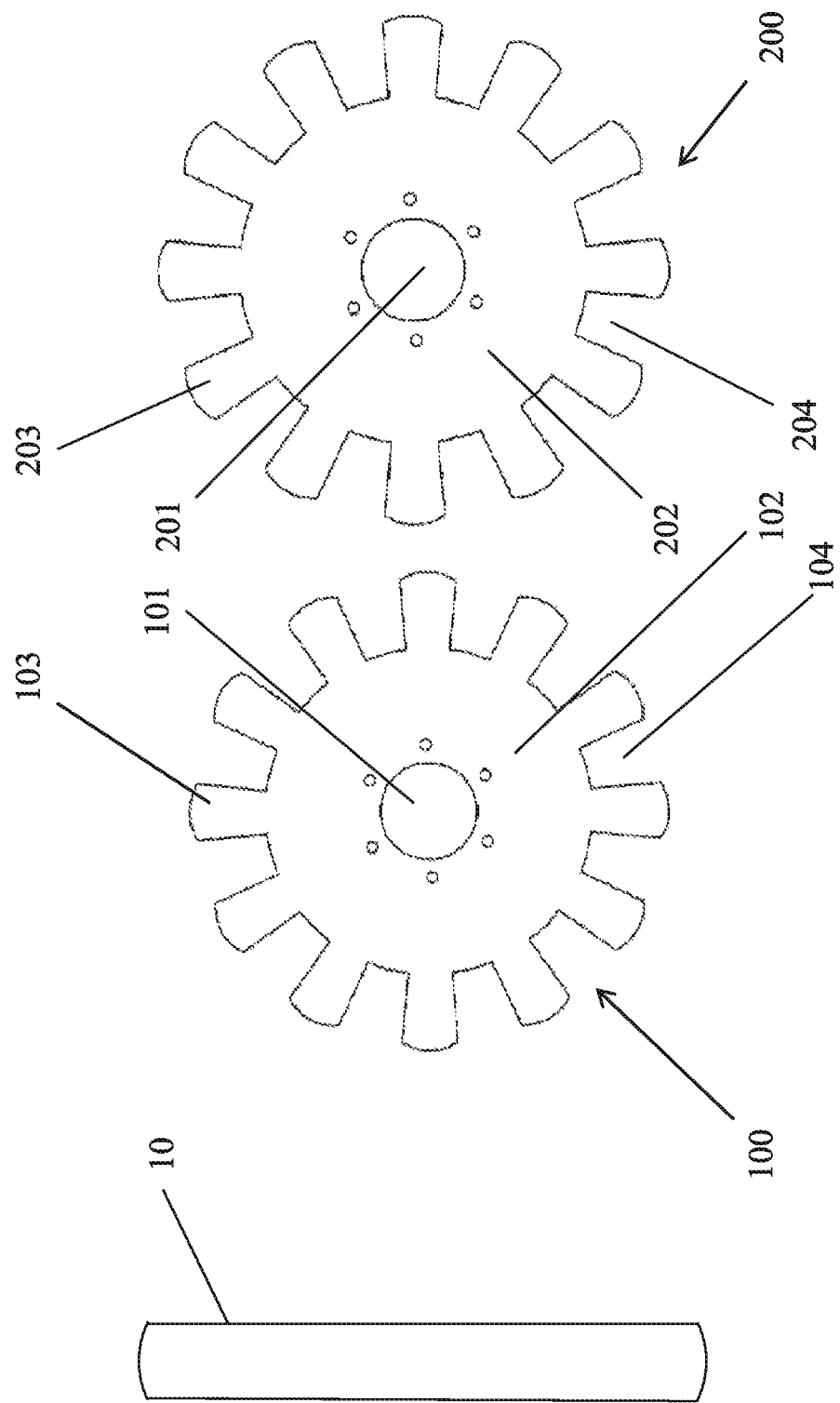
FIG. 2 is a diagram illustrating a rotating shaft (10) and the first rotating disk (100) and second rotating disk (200), according to an embodiment of the present invention.
Figure 3:
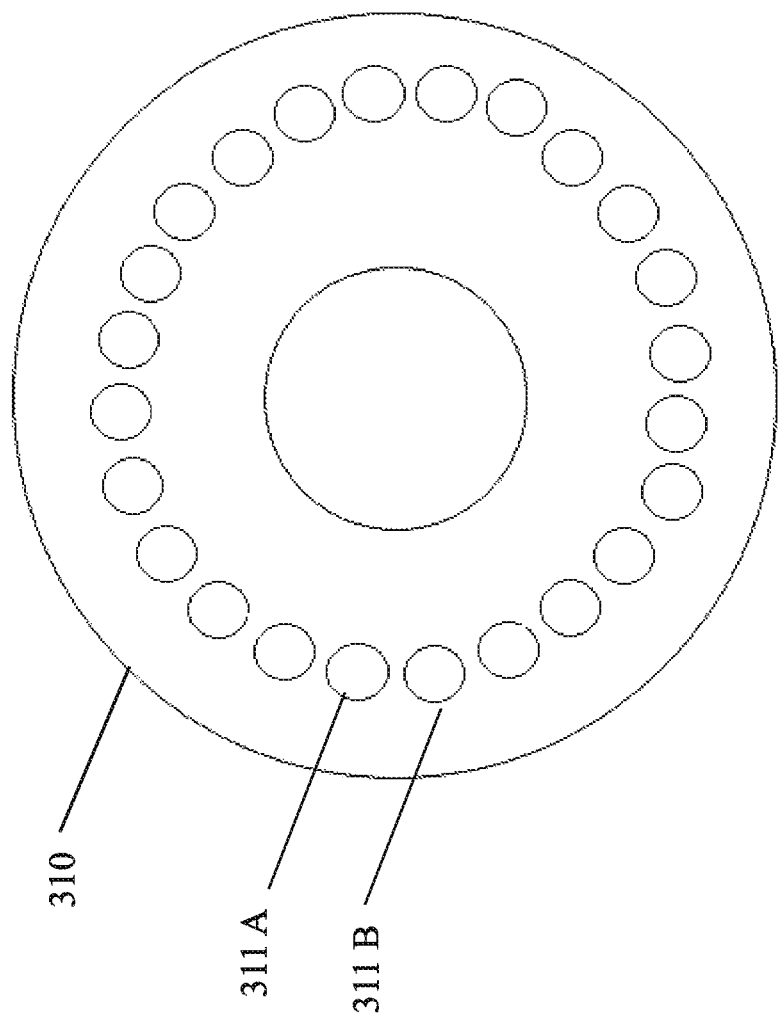
FIG. 3 is a diagram illustrating a magnet (300) and a coil base (310), according to an embodiment of the present invention.
Figure 3:
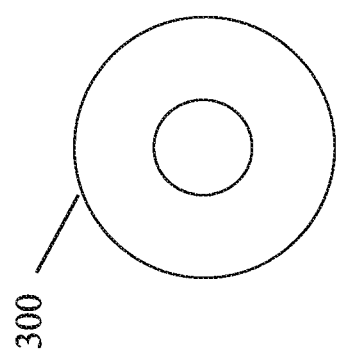
Figure 4:
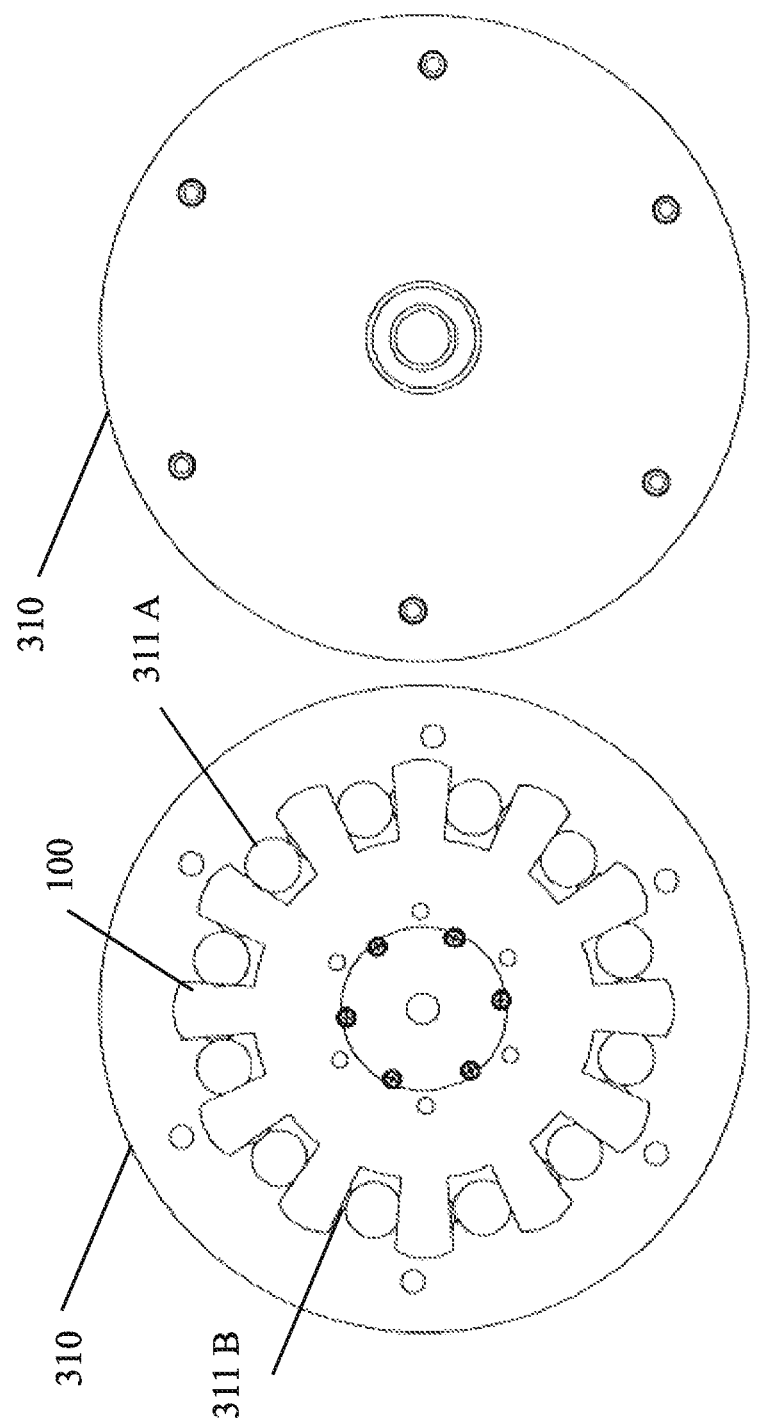
FIG. 4 is a diagram illustrating a coil base (310) mounted on the periphery of the magnet (300) and a rotating disk mounted over the coil base (310), according to an embodiment of the present invention.
Figure 5:
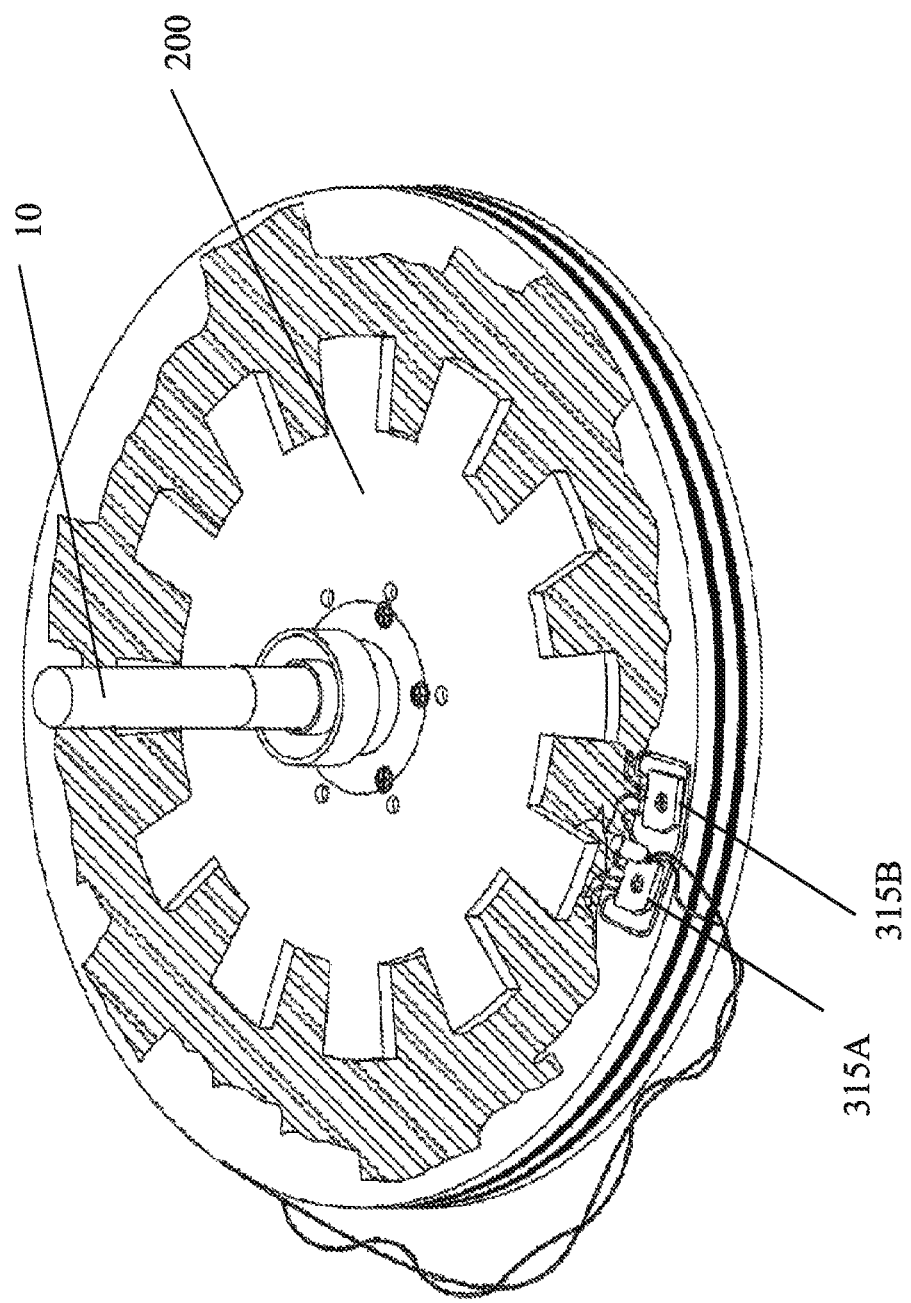
FIG. 5 is a diagram illustrating a wire winding on the coil base (310), according to an embodiment of the present invention.

The exemplary embodiments described herein detail for illustrative purposes are subjected to many variations. It should be emphasized, however, that the present invention is not limited to alternator device and method for converting mechanical energy into electrical energy. It is understood that various omissions and substitutions of equivalents are contemplated as circumstances may suggest or render expedient, but these are intended to cover the application or implementation without departing from the spirit or scope of the present invention.

The terms "a" and "an" herein do not denote a limitation of quantity, but rather denote the presence of at least one of the referenced item.

The terms "having", "comprising", "including", and variations thereof signify the presence of a component.

The present invention provides a alternator device and a method for converting mechanical energy into electrical energy. As described herein the term mechanical energy comprises energy associated with the motion of an object. The term electrical energy comprises energy associated with electric current and electrical potential. The alternator device and method provided by the present invention will now be explained in conjunction with FIGS. 1-6 A and B as below.

According to an embodiment of the invention, the device (1) comprises a rotating shaft (10), rotating disks (100 & 200), a magnet (300), a coil base (310) and mounting members (for example 105, 205 & 320). The rotating disks (100 & 200) are adapted to be mounted on the rotating shaft (10) in such a manner to enable the rotation of the rotating disks (100 & 200) when the rotating shaft (10) is in rotation. The rotating disks (100 & 200) are adapted to be mounted on the rotating shaft (10) along its longitudinal axis in such a manner that the rotating disks (100 & 200) are rotatable about the longitudinal axis of the rotating shaft (10).

The magnet (300) is adapted to be mounted intermediate the rotating disks (100 & 200) along the longitudinal axis of the rotating shaft (10) and to remain immovable while the rotating shaft (10) and the rotating disks (100 & 200) are in rotation. The magnet (300) is adapted to face North Pole towards one of the rotating disks (100 or 200) and to face South Pole towards the other rotating disk (100 or 200). The rotating disks (100 & 200) are made of a conductive material allowing the magnetization of the disks (100 & 200) by the magnet (300). The rotating disks (100 & 200) are preferably made of metal, and more preferably iron.

The first and second rotating disks (100 & 200) comprise respectively first and second coil ducts (104 & 204). The coil base (310) is adapted to be mounted intermediate the first and second rotating disks (100 & 200) along the longitudinal axis of the rotating shaft (10) for enabling the coil ducts (104 & 204) to pass through the coils (312) for generating electrical current while the rotating disks (100 & 200) are in rotation. The coil base (310) is adapted to remain immovable while the rotating disks (100 & 200) are in rotation. The coils (312) are adapted to correspond and align with the rotational movement of the coil ducts (104 & 204).

The rotating shaft (10) is preferably made of a non-magnetic material, and more preferably from stainless steel. The mounting members (for example 105, 205 & 320) are adapted to be connected to the rotating shaft (10) and to the rotating disks (100 & 200) in such a manner to enable the rotating disks (100 & 200) to rotate by the effect of the rotation of the rotating shaft (10) while the magnet (300) and the coil base (310) remain in a static position. The mounting members (for example 105, 205 & 320) comprise one or more mechanical components and are preferably made of non-magnetic materials such as stainless steel and reinforced plastic.

According to an embodiment of the present invention, the rotating disks (100 & 200) have central openings adapted to receive and allow the passage of the rotating shaft (10). The magnet (300) is preferably disk shaped and has a central opening for receiving the rotating shaft (10) in order to enable the magnet (300) when mounted along the rotating shaft (10) to be sandwiched between the rotating disks (100 & 200) along the longitudinal axis of the rotating shaft (10). Preferably, the magnet is not connected to the rotating shaft (10) as the magnet (300) needs to remain immovable during the rotation of the rotating disks (100 & 200). The coil base (310) is preferably disk shaped and comprises equally spaced radial coil openings (311) along its circumference, the coil openings (311) being adapted for receiving the coils (312).

According to an embodiment of the invention, the coil base (310) is coupled to the magnet (310) and adapted to extend radially outwardly from the periphery of the magnet (310) in the direction opposite the center of the magnet (300). The coil base (310) can also be adapted to receive and support the magnet (300) at a central portion thereof where the equally spaced coil openings (311) are adapted to be located at a peripheral portion of the coil base (310). The coil base (310) has a central opening adapted to be aligned with the central opening of the magnet (300) while mounted along the rotating shaft (10) for allowing the passage of the rotating shaft (10).

According to an embodiment of the invention, the coil base (310) is adapted to extend from the periphery of the magnet (300) in such a manner that it does not allow any spacing between the coil base (310) and the magnet (300). According to this embodiment, the coil base (310) is adapted to encapsulate the magnet (300) in such a manner that they both form a single unit with no displacement or motion whatsoever with respect to each other. The coil base (310) and the magnet (300) are securely and tightly coupled to each other.

According to an embodiment of the invention, the coil base (310) is made of a non-magnetic material for avoiding the magnetization of the coil base (310). The coil base (310) is preferably made of wood. According to an embodiment of the invention, the coil base (310) is circular in shape and has an outer diameter approximately equal to the outer diameter of the first rotating disk (100) and the outer diameter of the second rotating disk (200). The coil base (310) is adapted to be coupled to the periphery of the magnet (300) in such a manner to extend therefrom in the same planar plan. The coil base (310) comprises a plurality of equally spaced radial openings (311) configured at spaced-apart intervals (313) around the periphery of the coil base (310).

According to an embodiment of the invention, the device (1) further comprises a housing (500) and supporting shoulders within the internal periphery of the housing (500) adapted to be coupled and supported by the housing (500) of the device (1). According to this embodiment, the coil base (310) is adapted to be securely mounted within the device (1) using the supporting shoulders (not shown). In this case, the magnet (300) and the coil base (320) need not to be supported by the rolling member (320) and/or the rotating shaft (10). According to another embodiment, the coil base (31) is adapted to be supported by the rotating shaft (10). In this case, the rolling member (320) further comprises bearing balls adapted to be connected to the magnet (300) for securely supporting the magnet (300) and the coil base (320) when these are coupled to each other and adapted to avoid the rotation of the magnet (300) and the coil base (320) while the rolling member (320) is in rotation.

According to an embodiment of the invention, the device (1) further comprises coils (312) adapted to be located at the plurality of equally spaced radial coil openings (311) of the coil base (310). Preferably, the coils (312) comprise a wire winding adapted to carry electricity produced by the effect of the magnetization. The coils (312) are adapted to be located at the equally spaced radial coil openings (311) and correspond in dimensions to the plurality of first coil ducts (104) and the plurality of second coil ducts (204). The wire winding is used to carry electrical energy produced by the device (1). The wired winding can be connected to an internal or external electrical energy storage unit such as a battery (not shown) for storing the generated electrical energy and/or can supply the generated power to an electrical distributor and/or electrical components connected thereto.

According to an embodiment of the present invention, the magnet (300) is disk shaped, the rotating disks (100 & 200) are metallic (preferably iron), the rotating shaft (10) is made of a non-magnetic material (preferably stainless steel), the mounting member (310) is made of a non-magnetic material (preferably reinforced plastic), and the coil base (310) is made of a non-magnetic material (preferably wood). The magnet (300) is adapted to be sandwiched between the first rotating disk (100) and the second rotating disk (200) along the longitudinal axis of the shaft (10). Preferably, the magnet (300) is not in physical contact with the first and second rotating disks (100 & 200).

The coil base (310) is adapted to extend radially outwardly from the periphery of the magnet (300). The coil base (310) comprises a plurality of equally spaced radial coil openings (311) configured along the circumference (311) of the coil base (310). The coil openings (311) are adapted to receive the coils (312). The coils (312) are adapted to be connected to a wire winding throughout the plurality of equally spaced radial coil openings (311) for transporting the generated electrical current.

According to an embodiment of the invention, the rotating shaft (10) is circular in cross-section perpendicular to its longitudinal axis and has a first end (11) and a second end (12). The rotating shaft (10) is preferably made of a non-magnetic material, preferably stainless steel, in order to avoid any magnetization of the rotating shaft (10) which may slow the rotation of the disks (100 & 200) during operation of the device (1). Accordingly, the non-magnetic material is adapted to avoid the magnetization of the shaft (10) during the operation of the alternator device (1). The rotating shaft (10) is adapted to have specific dimensions (including length and diameter) adapted to the dimensions of the rotating disks (100 & 200) and the disk shaped magnet (300). These dimensions are determined according the objective of the application in which the device is applied. It should be understood that the device can be applied in a wide range of applications and can have different dimensions and specificities depending on the requirements of the applications.

The first rotating disk (100) and the second rotating disk (200) are preferably similar, and more preferably identical, in structure. The rotating disks (100 & 200) are made of a magnetisable material, preferably metallic, and more preferably iron, whereas, the magnetisable material is adapted to go through the magnetization effect. The rotating disks (100 & 200) have a central opening (101 & 201) respectively adapted to allow the passage of the rotating shaft (10). The central opening (101 & 201) in each of the rotating disks (100 & 200) is adapted to receive the non-magnetic shaft (10) in such a manner to enable the rotating disks (100 & 200) to be mounted along the non-magnetic shaft (10).

According to an embodiment of the invention, the first rotating disk (100) comprises a circular body portion (102) having the central opening (101) centered about the disk axis of rotation and further comprises a plurality of first extension members (103) extending radially outwardly from the circumference of the body portion (102) away from the disk axis of rotation along a same planar plan. In an embodiment of the invention, the body portion (102) and the first extension members (103) are molded together and form a single piece as an integral part of the first rotating disk (100). Preferably, the first extension members (103) are spaced at an equal interval along the circumference of the body portion (102). The spaces defined between the first extension members (103) form the first coil ducts (104) of the first rotating disk (100).

According to an embodiment of the invention, the second rotating disk (200) comprises a circular body portion (202) having the central opening (201) centered about the disk axis of rotation and further comprises a plurality of second extension members (203) extending radially outwardly from the circumference of the body portion (202) away from the disk axis of rotation along a same planar plan. In an embodiment of the invention, the body portion (202) and the second extension members (203) are molded together and form a single piece as an integral part of the second rotating disk (200). Preferably, the second extension members (203) are spaced at an equal interval along the circumference of the body portion (202). The spaces defined between the second extension members (203) form the second coil ducts (204) of the first rotating disk (200).

According to an embodiment of the invention, the mounting members comprise a first hollow cylindrical ring (105) adapted to be coupled to the rotating shaft (10) and to the first rotating disk (100) for securely mounting the first rotating disk (100) on the rotating shaft (10). The central opening of the first metallic disk (100) is adapted to receive the first hollow cylindrical ring (105). The first hollow cylindrical ring (105) is adapted to be rotatable by the effect of the rotation of the rotating shaft (10). Accordingly, the first hollow cylindrical ring (105) enables the rotation of the first rotating disk (100) along with the the rotation of the rotating shaft (10).

According to an embodiment of the invention, the mounting members comprise a second hollow cylindrical ring (205) adapted to be coupled to the rotating shaft (10) and the second rotating disk (200) for securely mounting the first rotating disk (200) on the rotating shaft (10). The central opening of the second metallic disk (100) is adapted to receive the second hollow cylindrical ring (205). The second hollow cylindrical ring (205) is adapted to be rotatable by the effect of the rotation of the rotating shaft (10). Accordingly, the second hollow cylindrical ring (205) enables the rotation of the second rotating disk (200) along with the the rotation of the rotating shaft (10).

According to an embodiment of the invention, the first and second hollow cylindrical rings (105 & 205) are preferably made of a non-conducting material. The non-conducting material is preferably selected from a wood material, a plastic material, or a ceramic material. More preferably, the non-conducting material is plastic.

According to an embodiment of the invention, the coil base (310) has a circular perimeter (circumference) and coupled to the magnet (300) in such a manner to extend radially outwardly from the perimeter of the magnet (300) away from the centre axis of the magnet (300). As explained above, the magnet (300) can also be positioned on the planar surface of the central portion of the coil base (310).

According to an embodiment of the invention, the magnet (300) has a body portion (302) preferably having a circular shape and a central opening (301) adapted to allow the passage of the rotating shaft (10). Preferably, the magnet (300) has a planar surface smaller in size than the planar surface of the first and second rotating disks (100 & 200). The planar surface of the magnet (300) is preferably similar in size to the surface of the body portions of the rotating disks (100 & 200). The magnet (300) is adapted to be mounted intermediate the first rotating disk (100) and the second rotating disk (200) along the rotating shaft (10). The body portion (302) of the magnet (300) comprises a north side face (306) and a south side face (307). The north side face (306) of the magnet (300) projects towards one rotating disk (100 or 200) and the south side face (307) of the disk shaped magnet (300) projects towards the other rotating disk (100 or 200).

According to an embodiment of the invention, the mounting members comprises a rolling member (320) adapted to be coupled to the rotating shaft (10) and to the first and second rotating disks (100 & 200). The rolling member (320) comprises an opening adapted to receive the rotating shaft (10) for enabling the rolling member (320) to be mounted on the rotating shaft (10). The central opening (301) of the magnet (300) has suitable dimensions in order to receive the rolling member (320) without however being in physical contact therewith in order to avoid any movement of the magnet when the rotating shaft (10) and the rolling member (320) are in rotation. This is since the rolling member (320) is adapted to rotate with the rotation of the rotating shaft (10). In another embodiment of the invention, the mounting members further comprise rolling balls adapted to be coupled to the rolling member (320) and to the magnet (300) for securely holding the magnet (300) to the rolling member (320) and to the shaft (10) where the bearing balls are adapted to mounted between the rolling member (320) and the magnet (300) and adapted to avoid the rotation of the magnet (300) while the rolling member (320) is in rotation. The rolling member (320) is adapted to be mechanically coupled to the first and second rotating disks (100 & 200) using fixing members such as screws. The coupling between the rolling member (320) and the first and second rotating disks (100 & 200) allow these rotating disks (100 & 200) to rotate while the rotating shaft (10) and the rolling member (320) are in rotation.

The magnet (300) is adapted to remain immovable and static during the operation of the device (1). The rotating disks (100 & 200) and the magnet (300) are adapted to have suitable dimensions, including diameter and thickness, depending on the application to which the device is applied. In fact, increasing the dimensions (including thickness and diameter) of these components (100, 200 & 300) increases the overall power of the device and the amount of energy which can be generated by the device. These dimensions can vary from one application to another depending on the needs of each application and the amount of power desired.

According to an embodiment of the invention, the rotating shaft (10) is adapted to be rotated by a mechanical/motional force. The rotating shaft (10) being coupled to the rolling member (320), the rotation of the rotating shaft (10) triggers the rotation of the rolling member (320) which in turn is coupled to the first and second rotating disks (100 & 200) triggering their rotation. The magnet (300) remains static in position during the rotation of the rotation shaft (10) and the rotating disks (100 & 200). The magnet (300) produces a first magnetic field in the first rotating disk (100) and a second magnetic field in the second rotating disk (200). The first and second magnetic fields are of opposite poles. For example, the first magnetic field can be a North Pole and the second magnetic field can be a South Pole or vice versa.

Figure 6B:
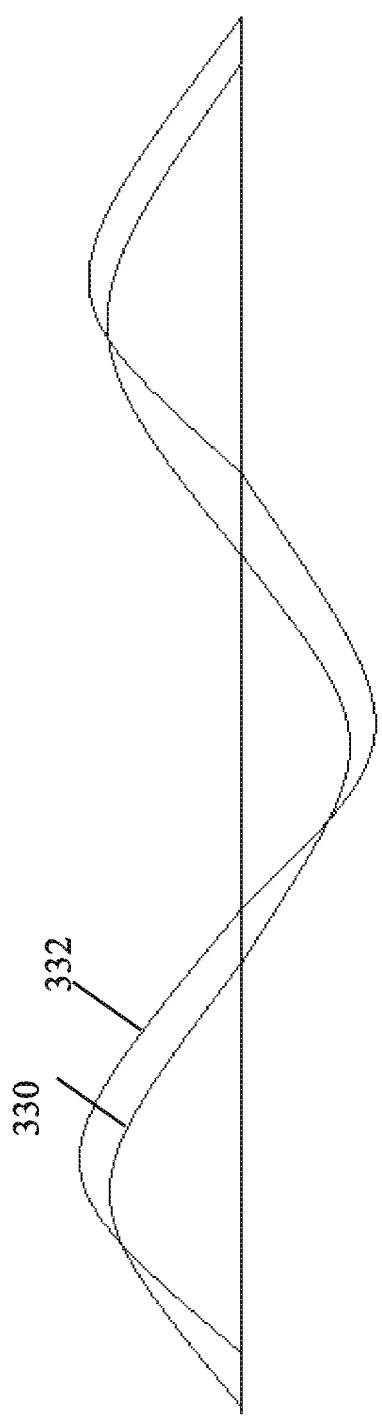
FIG. 6B shows the first and second electrical fluxes in phase after inversion of the second electrical flux (332).
Figure 6A:
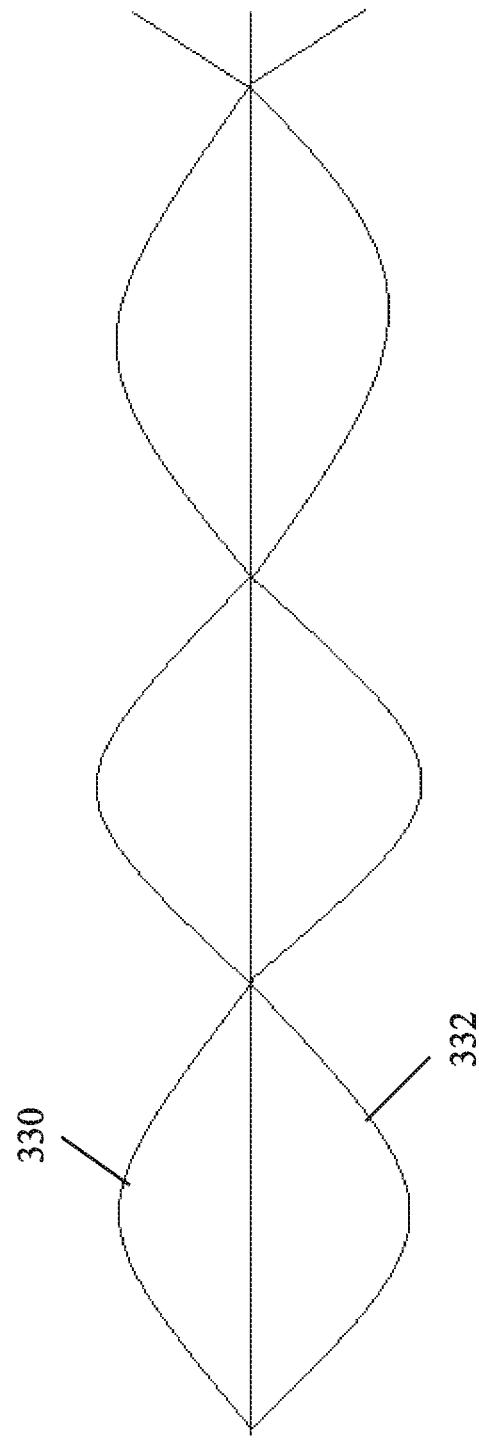
FIG. 6A shows the first and second electrical fluxes (330 and 332) out of phase as produced by the coils (312a and 312b).

The rotation of the rotating disks (100 & 200) allow the coil ducts (104 & 204) to pass through the coils (312) enabling the generation of an electric filed which is transported by the wire winding which can be connected to electrical rectifiers. As shown in FIGS. 6A and 6B, a first group of the coils (312*a*) produces a first electrical flux (330) where a second group of the coils (312*b*) forms a second electrical flux (332) out of phase with respect to the first electrical flux. The first group of the coils (312*a*) producing the first electrical flux are connected to a first electrical rectifier (315*a*), where the second group of the coils producing the second electrical flux are connected to a second electrical rectifier (315*b*) with an inverter where the electrical charge is inverted to put the second electrical flux in phase with the first electrical flux such that both electrical fluxes are added to each other and do not cancel each other. FIG. 6A shows the first and second electrical currents (330 and 332) out of phase as produced by the coils (312*a* and 312*b*). FIG. 6B shows both fluxes in phase after inversion of the second electrical flux (332). The first and second electrical rectifiers (315*a* and 315*b*) are then connected to an electrical storage unit (such as a battery) for storing the electrical energy generated and/or to electrical components for power supply.

Accordingly, many variations of these embodiments are envisaged within the scope of the present invention. Further, the present invention should not be construed to be limited to the configuration of the device and method as described herein only. Various construction of the device is possible which shall also lie within the scope of the present invention. The foregoing descriptions of specific embodiments of the present invention have been presented for purposes of illustration and description. They are not intended to be exhaustive or to limit the present invention to the precise forms disclosed, and many modifications and variations are possible in light of the above teaching. The embodiments were chosen and described in order to best explain the principles of the present invention and its practical application, and to enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

The invention claimed is:

1. A method of manufacturing an alternator device for converting mechanical energy into electrical energy, the method comprising:
   providing a magnet having a north pole magnet surface and a south pole magnet surface;
   providing a first and second rotating disks;
   providing a coil base comprising coils;
   providing a rotating shaft;
   providing mounting members; and
   mounting the magnet and the rotating disks on the rotating shaft using the mounting members such that the magnet is located intermediate the first and second rotating disks without a physical contact therebetween, where the north pole magnet surface projects towards the first rotating disk and the south magnet surface projects towards the second rotating disk, and such that when the rotating shaft is in rotation, the rotating disks rotate while the magnet and the coil base remain in a static position,
   wherein the first and second rotating disks are mounted along a longitudinal axis of the rotating shaft parallel to each other,
   and wherein the coil base, the rotating shaft and the mounting members are made of a non-magnetic material for avoiding magnetization of the coil base and rotating shaft and thereby avoiding slow rotation of the first and second rotating disks during operation of the alternator device.

2. The method of manufacturing of claim 1 wherein:
   the rotating disks are made of a magnetic material.

3. The method of manufacturing of claim 2 wherein:
   the rotating disks are made of iron;
   the coil base is made of wood, the rotating shaft is made of stainless steel and the mounting members are made of reinforced plastic or stainless steel.

4. The method of manufacturing of claim 1 further comprising:
   connecting the rotating shaft to a mechanical energy generation device for enabling rotation of the rotating shaft.

5. The method of manufacturing of claim 4 wherein the mechanical energy generation device is a wind turbine.

* * * * *